United States Patent
Loeser

(10) Patent No.: US 12,551,267 B2
(45) Date of Patent: Feb. 17, 2026

(54) CUTTING INSTRUMENT

(71) Applicant: Erbe Elektromedizin GmbH, Tuebingen (DE)

(72) Inventor: David Loeser, Rottenburg am Neckar (DE)

(73) Assignee: ERBE ELEKTROMEDIZIN GMBH, Tuebingen (DE)

( * ) Notice: Subject to any disclaimer, the term of this patent is extended or adjusted under 35 U.S.C. 154(b) by 750 days.

(21) Appl. No.: 17/572,305

(22) Filed: Jan. 10, 2022

(65) Prior Publication Data

US 2022/0218408 A1 Jul. 14, 2022

(30) Foreign Application Priority Data

Jan. 12, 2021 (EP) ..................................... 21151169

(51) Int. Cl.
*A61B 18/14* (2006.01)
*A61B 18/00* (2006.01)

(52) U.S. Cl.
CPC ...... *A61B 18/1445* (2013.01); *A61B 18/1482* (2013.01); *A61B 2018/00077* (2013.01); *A61B 2018/00083* (2013.01); *A61B 2018/00607* (2013.01); *A61B 2018/1452* (2013.01)

(58) Field of Classification Search
CPC ........ A61B 2018/1482; A61B 18/1482; A61B 18/1445
See application file for complete search history.

(56) References Cited

U.S. PATENT DOCUMENTS

| 10,987,157 B2 * | 4/2021 | Weiler | ............... A61B 18/1445 |
| 11,123,131 B2 | 9/2021 | Mayer et al. | |
| 2004/0049185 A1 * | 3/2004 | Latterell | ............ A61B 18/1442 |
| | | | 606/50 |

(Continued)

FOREIGN PATENT DOCUMENTS

| CN | 101563042 A | 10/2009 |
| CN | 106491203 A | 3/2017 |

(Continued)

OTHER PUBLICATIONS

National Intellectual Property Administration, PRC; Chinese Office Action and Search Report in corresponding Chinese Patent Application No. 202210025453.4, dated Jun. 16, 2024; 18 pages.

(Continued)

*Primary Examiner* — Linda C Dvorak
*Assistant Examiner* — Ryan T Clark
(74) *Attorney, Agent, or Firm* — Fitch, Even, Tabin & Flannery LLP

(57) ABSTRACT

An instrument (10) that is usable for tissue fusion and cutting includes a counter support (22) configured as a thin membrane that is assigned to a cutting electrode (17) arranged between two electrode pairs. The thin membrane is spanned in a frame (25) on which it is held with its circumferential surface in a substance bond manner. The circumferential surface thereby extends in an angle, preferably in a right angle, relative to the coagulation electrodes (28, 29) formed by the frame top side. The pressing force applied by the membrane with which biological tissue (32) is pressed against cutting electrode (17) is thus predominantly created by the tensile stress present in the membrane.

10 Claims, 4 Drawing Sheets

(56) References Cited

U.S. PATENT DOCUMENTS

| | | | |
|---|---|---|---|
| 2009/0234355 A1 | 9/2009 | Edwards et al. | |
| 2013/0110126 A1 | 5/2013 | Mujwid | |
| 2015/0374430 A1* | 12/2015 | Weiler | A61B 18/1445 |
| | | | 606/46 |
| 2016/0331515 A1 | 11/2016 | Ben Nun et al. | |

FOREIGN PATENT DOCUMENTS

| | | | |
|---|---|---|---|
| CN | 106562821 A | | 4/2017 |
| EP | 1632192 A1 | | 3/2006 |
| EP | 2754403 A2 | | 7/2014 |
| EP | 2959854 A1 | | 12/2015 |
| EP | 3132765 A1 | | 2/2017 |
| EP | 3138522 A1 | | 3/2017 |
| JP | 2004180843 | * | 7/2004 |
| JP | 2004180843 A | | 7/2004 |
| JP | 2017-38927 A | | 2/2017 |
| JP | 2017-47198 A | | 3/2017 |
| JP | 2021-433 A | | 1/2021 |
| RU | 53884 U1 | | 6/2006 |

OTHER PUBLICATIONS

Extended European Search Report and Written Opinion dated Jul. 1, 2021, in corresponding European Application No. 21151169.9, with machine English translation (16 pages).

Federal Institute of Industrial Property (FIPS) Office Action in corresponding Russian Patent Application No. 2021139055/14(081628), dated Dec. 18, 2024; 20 pages.

Japanese Patent Office; Notice of Reasons for Refusal in corresponding Japanese Patent Application No. 2021-209163, dated Jan. 31, 2025; 9 pages.

National Intellectual Property Administration, P. R. China, Notification to Grant Patent Right for Invention in corresponding Chinese Patent Application No. 202210025453.4, dated Mar. 13, 2025, 6 pages.

* cited by examiner

CUTTING INSTRUMENT

RELATED APPLICATION(S)

This application claims the benefit of European Patent Application No. 21151169.6, filed Jan. 12, 2021, the contents of which are incorporated herein by reference as if fully rewritten herein.

TECHNICAL FIELD

The invention refers to an electrosurgical instrument that is configured and suitable for cutting or for tissue fusion or for tissue coagulation, particularly combined with cutting of tissue.

BACKGROUND

JP 2004180843 A discloses a tissue coagulation and cutting instrument having two jaws in the type of a forceps with jaws movable relative to one another between which tissue can be held. The two jaws can be applied with current in order to coagulate tissue held therebetween. In addition, one of the jaws comprises a cutting element to which an elastic counter support arranged on the other jaw is assigned. Different configurations are proposed for the counter support. For example, the elastic counter support can have a square massive cross-section, a hollow cross-section or a stepped cross-section in the type of a flat T and can be inserted into a downwardly open groove of the bottom jaw. This counter support comprises a wider top section facing the cutting element and a narrower section extending into the groove. During closing of the jaw the counter support deforms into the groove. While the center section of the counter support does not abut anywhere, the edges of the counter support are held and supported on steps extending along the center groove.

A coagulation and cutting instrument having an elastic counter support is known from US 2004/0049185 A1. The counter support comprises an approximately square cross-section and is supported on its side opposite the cutting electrode between the two legs of a jaw that is apart therefrom configured in a U-shaped manner. The flanks of the counter support are exposed.

US 2009/0234355 A1 discloses a coagulation and cutting instrument having a cutting electrode arranged in a jaw and a movably supported counter support arranged in the other jaw. The latter is resiliently supported in order to be able to dodge the intruding cutting electrode.

Further examples for electrosurgical instruments having coagulation electrodes, cutting electrodes and counter supports assigned to the cutting electrodes can be taken from EP 1 632 192 A1 and EP 2 754 403 A2.

The requirements on coagulation and cutting instruments increase in multiple aspects. Miniaturization tendencies as well as requirements for manufacturing reliability and manufacturing accuracy exist.

Starting therefrom it is the object of the invention to provide an instrument that is improved at least in one respect.

SUMMARY

The inventive instrument as described herein complies with this object:

The instrument according to the invention comprises a cutting electrode on a jaw and an elastic counter support on the other opposed jaw. The counter support is held in a frame that is provided by a respective jaw itself or a separate component. The counter support comprises a circumferential surface that is connected with a frame in a tension-resistant manner. The frame fixes the counter support at least at two sides opposite to one another. Preferably the frame surrounds the counter support on three sides, i.e. on its two flanks and on the distal end. The counter support is connected with the frame at least at its two longitudinal sides or flanks and optionally also at its distal end. In the latter case the counter support closes the frame completely and does not allow material to enter into the area below the counter support. It is, however, also possible to leave the membrane free at its distal end and/or at its proximal end, i.e. disconnected from the frame.

The frame comprises a surface facing the counter support that is connected with the circumferential surface of the counter support. The connection is tension-resistant, i.e. a tension force directed from the edge of the counter support toward its center does not release the counter support from the frame. The connection is preferably free of gaps, i.e. the circumferential surface of the counter support is entirely two-dimensionally connected with the frame. Preferably, in case of tensional stress, no part of the counter support lifts off from the frame. A tensile force can be created in that the cutting electrode—and where appropriate biological tissue present between the cutting electrode and the counter support—presses on the counter support during closing of the jaw. The counter support is thereby displaced from its rest position and tensioned. Thereby the counter support is preferably flexible, such that mainly tensile stresses are created due to the deformation of the counter support, which is why the counter support is also denoted as "membrane". In the preferred case the counter support is configured such that it is in the so-called membrane condition, i.e. in terms of its mechanical stresses in the non-loaded condition with open jaws and preferably also in the loaded condition with closed jaws the tensile stresses present in the material of the counter support are at least approximately equal everywhere.

The tensile-resistant connection between the counter support and the frame is preferably a substance bond connection, as appropriate an exclusively substance bond connection. It can be realized in a simple manner in that a membrane is created in an ejection molding process, whereby the frame forms a part of the injection molding die, i.e. limits the material flow of the still liquid counter support at the circumferential surface of the created counter support. The frame preferably consists of metal. The counter support preferably consists of flexible plastic, e.g. a silicone plastic. The adhesion between the circumferential surface of the membrane and the frame can be increased by a respective surface design of the frame surface facing the membrane, e.g. by roughening. In addition, the frame surface can be activated entirely or in sections for improvement of the adhesion of the counter support. For this the surface can be locally or entirely subject to a CVD or PVD coating process. If the frame is a punched part, surface unevennesses of the frame created during punching can be used for improvement of the adhesion between the frame and the membrane.

The tensile-resistant connection between the counter support and the frame can be supported by a form-fit between counter support and frame, e.g. in that the frame comprises form-fit structures along its surface facing the counter support, as for example openings, cut-outs or the like.

Preferably the counter support is held in the frame without support. Particularly, it does not abut against any surface facing opposite the intruding direction of the cutting electrode. In other words, the free top surface facing the cutting electrode is as large as the free bottom surface of the counter support facing away from the cutting electrode. As a result of this arrangement, biological tissue held between the jaws is particularly softly and uniformly pressed against the cutting electrode, such that that the tissue held between the cutting electrode and the counter support is electrically cut, however, not mechanically squeezed. The separation process is exclusively electrical. This can be achieved in large configurations of the instrument as well as in miniaturized configurations thereof.

The counter support consists preferably of an electrically insulating plastic, such as silicone. It can, however, also consist of a plastic that is electrically conductive intrinsically or extrinsically, i.e. by embedding electrically conductive substances or particles. In doing so, an additional thermal effect can be created during the flow of current through the tissue.

Preferably the counter support comprises two flanks that are arranged in constant distance to one another. However, the distance can also decrease in distal direction.

In its central section that contacts the cutting electrode in the closed condition, the counter support can have a thickness that is as most as large as the thickness at the edge of the counter support. Preferably the thickness in the central section is even smaller than at the edge of the counter support. In doing so, a main advantage of the invention is supported. During closing of the instrument the counter support is preferably subject to elongation and lesser to compression or bending, as it was frequently the case in the prior art. In doing so, the membrane-like counter support can also well adapt to an inhomogeneous tissue and keep it in soft contact with the cutting electrode. It is, however, also possible to make the thickness of the counter support in the center below the cutting electrode larger than at the edge (at the flank or circumferential surface).

The counter support can be domed away or toward the cutting electrode in the rest position. In doing so, different spring characteristics can be adjusted in order to achieve a desired progress of the pressing force of the tissue against the cutting electrode during compression, i.e. during closure of the instrument.

In an advantageous embodiment the counter support ends flush with the frame on its top side as well as on its bottom side. This simplifies production of the instrument, particularly the creation of the counter support in the frame.

The counter support can comprise one or multiple sections extending on the frame. Preferably such a section is arranged at least at the distal end of the counter support or the jaw comprising it. Such sections can serve as spacers of the jaws and avoid that they get directly in contact during closing. Apart from these sections it is, however, advantageous if the counter support apart therefrom ends flush with the frame on the top side and the bottom side.

BRIEF DESCRIPTION OF THE DRAWINGS

Further details of advantageous embodiments of the invention are derived from the drawings, the associated description as well as the claims. The drawings show:

DETAILED DESCRIPTION

Figure 1:
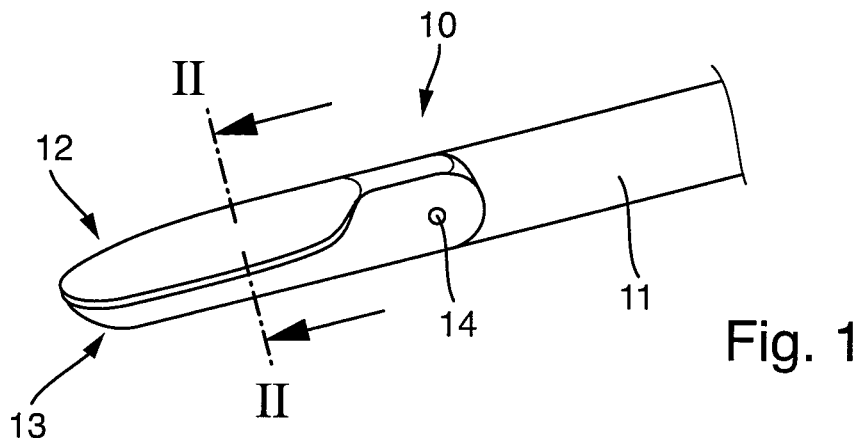
FIG. 1 the inventive instrument in a closed condition.

In FIG. 1 an instrument is illustrated that is configured for tissue fusion and cutting. The instrument can be an instrument for the open surgical use, an instrument for the laparoscopic use or also an instrument for the endoscopic use. The instrument 10 comprises jaws 12, 13 that are, for example, held on a flexible shank 11 or also on a rigid shank, whereby at least one of the jaws, in the present embodiment the top jaw 12, is pivotably supported in order to be able to be moved toward and away from the other jaw, in the present example the bottom jaw 13. The pivot movement around the hinge axis A is controlled by a not further illustrated mechanism extending through the shank 11.

As an alternative, the instrument 10 can also comprise two pivotably supported jaws that are movable toward and away from each other.

Figure 2:
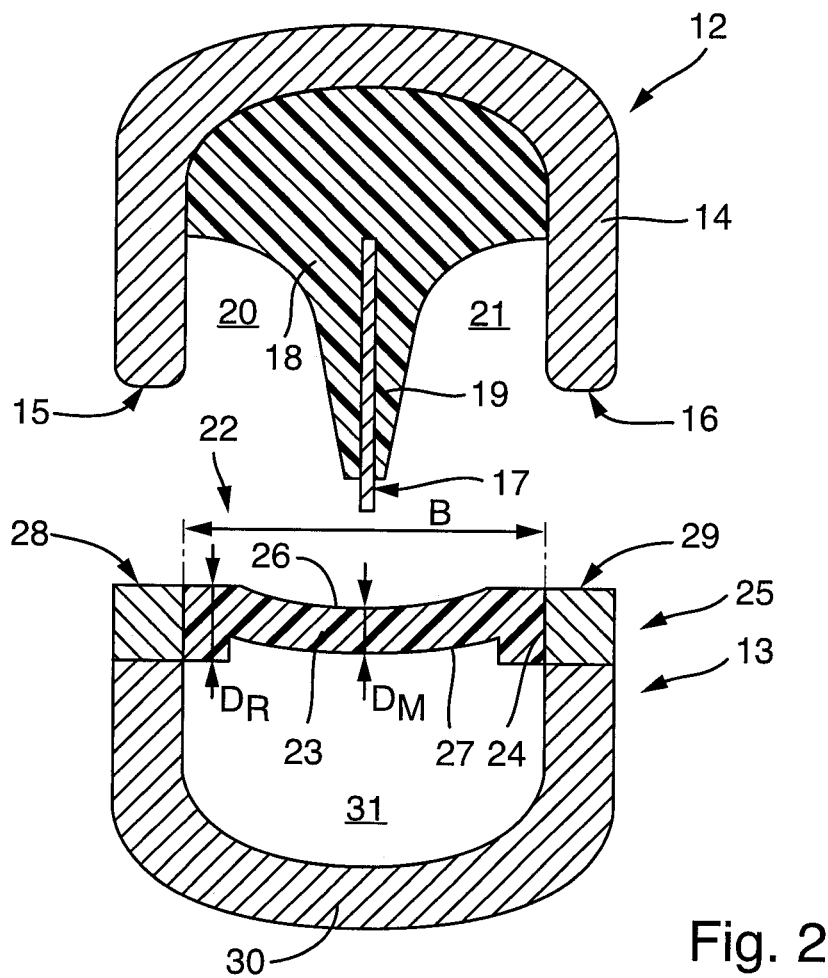
FIG. 2 the top and bottom jaw of the instrument according to FIG. 1 in open condition in a cross-section, FIG. 3 the instrument according to FIGS. 1 and 2 in closed condition in a cross-section without tissue, FIG. 4 the instrument according to FIG. 3 with tissue held between the jaws in a cross-sectional illustration, FIG. 5 a modified embodiment of the instrument in a cross-sectional illustration in slightly opened condition, FIG. 6 a further modified embodiment of the inventive instrument in a cross-sectional illustration with slightly opened jaws, FIG. 7 the bottom jaw of the instrument according to FIG. 6 in a perspective illustration in part and FIG. 8 a plastic injection molding die for manufacturing the counter support for the instrument according to FIGS. 1-5.

FIG. 2 illustrates instrument 10 according to FIG. 1 in cross-section, cut along line II-II in FIG. 1. For example, top jaw 12 can be made of a metal part 14 having U-shape in cross-section and being metallically bare or also electrically insulated on the outside, the leg faces 5 thereof serve as coagulation electrodes 15, 16. The coagulation electrodes 15, 16 can be continuously strip-shaped electrodes, they can also be interrupted by insulating sections. Instead of a metal part 14, the upper jaw 12 can also comprise another part made, for example, of a non-conductive material, such as for example plastic, in that the coagulation electrodes 15, 16 are embedded, e.g. in the form of sheet parts.

The top jaw 12 is provided with a cutting electrode 17 that is, e.g. made of a thin metal sheet strip. Preferably the cutting electrode 17 is held in an insulating body 18 approximately centered between the coagulation electrodes 15, 16. The cutting electrode 17 is preferably arranged in the extension 19 of insulating body 18 such that the two flat sides of the cutting electrode 17 are insulated. Between extension 19 and the legs of the top jaw 12 supporting the coagulation electrodes 15, 16, clearances 20, 21 are created that serve for location of tissue therein.

The bottom jaw 13 comprises a counter support 22 that serves to hold biological tissue on the cutting electrode 17 during a cutting process. The counter support 22 is a flexible body, consisting for example of silicone, the thickness $D_M$ measured in a central section 23 thereof—particularly in extension of the cutting electrode 17—is smaller than the width B measured transverse thereto. Counter support 22 consists of solid material. Preferably it does not comprise any hollow spaces.

Laterally the counter support 22 adjoins a frame 25 with its circumferential surface 24 and is connected therewith in a tension-resistant manner, preferably in a substance bond manner, e.g. by overmolding or gluing. The circumferential surface 24 is preferably non-structured, i.e. smooth apart from processing marks such as punch or fracture surfaces. It can, however, also be structured in order to support the substance connection between counter support 22 and frame 25, e.g. by means of form-fit.

The counter support 22 comprises a thickness $D_R$ at its edge adjoining the circumferential surface 24 that is preferably at least as large as the thickness $D_M$ in the central section 23. Furthermore, the thickness $D_R$ thereby corresponds to a thickness of the frame 25 to be measured in the same direction, such that counter support 22 ends flush with frame 25 on its top side 26 as well as its bottom side 27.

The frame 25 consists preferably of metal, such that its top side forms the coagulation electrodes 28, 29. They can transition into one another at the distal end of the respective jaw 12 or 13.

The unit consisting of counter support 22 and frame 25 can be manufactured in an injection-molding process in which a pre-manufactured frame 25 is inserted into a respective injection molding die in which then the plastic material of the counter support 22 is introduced in order to closely connect with frame 25 at the circumferential surface 24. The unit created in this manner is connected with the remaining load-carrying part of bottom jaw 13 that is made of a U-shaped metal part 30 in the present embodiment. It can be metallically bare or electrically insulated, e.g. provided with a plastic coating, on its outer side. Also frame 25 can be metallically bare, i.e. electrically conductive, or alternatively provided with an insulation at its side facing outwardly. Frame 25 can be electrically conductively connected with metal part 30 or can also be insulated relative thereto. Between counter support 22 and metal part 30 a clearance 31 can be formed that can be separated from the environment or also connected therewith by suitable openings.

Figure 3:
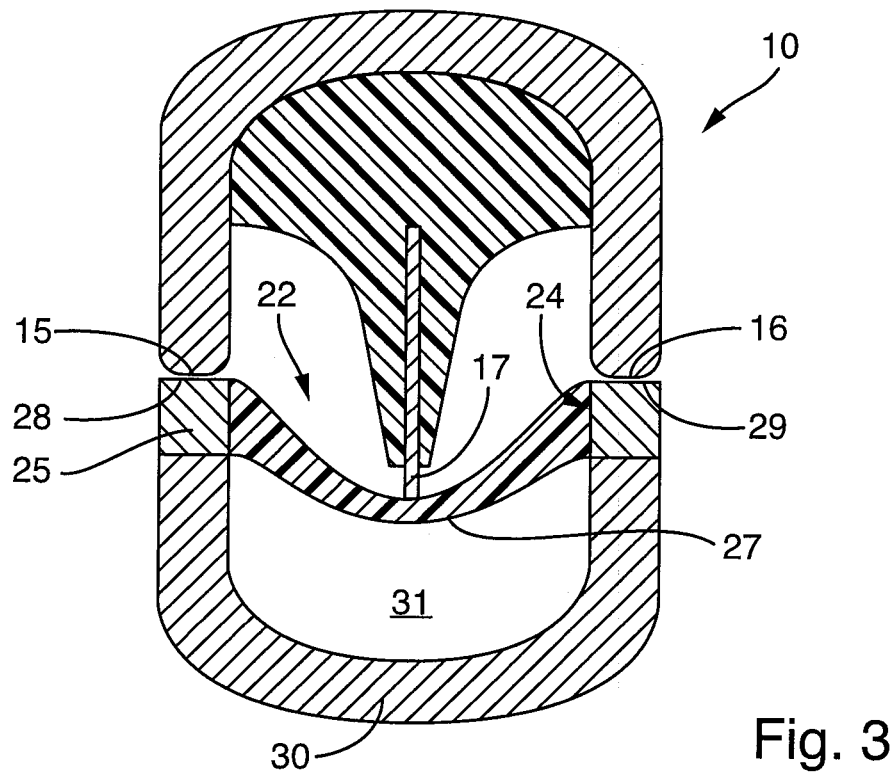

FIG. 3 illustrates the instrument 10 in closed condition. Electrodes 15, 28 contact one another or are kept in small distance to one another by means of not further illustrated spacers. The same applies for the coagulation electrodes 16, 29. Cutting electrode 17 stands on counter support 22 and presses it into clearance 31 without the bottom side 27 of counter support 22 being in contact with metal part 30 or any other part that is present in the clearance 31. Because the counter support 22 is slim in cross-section, i.e. because its thickness $D_M$ is remarkably smaller than its width B, counter support 22 is substantially subject to tension in the deformation illustrated in FIG. 3. It is stretched. Similarly the connection between its circumferential surface 24 and frame 25 is substantially subject to tension.

Figure 4:
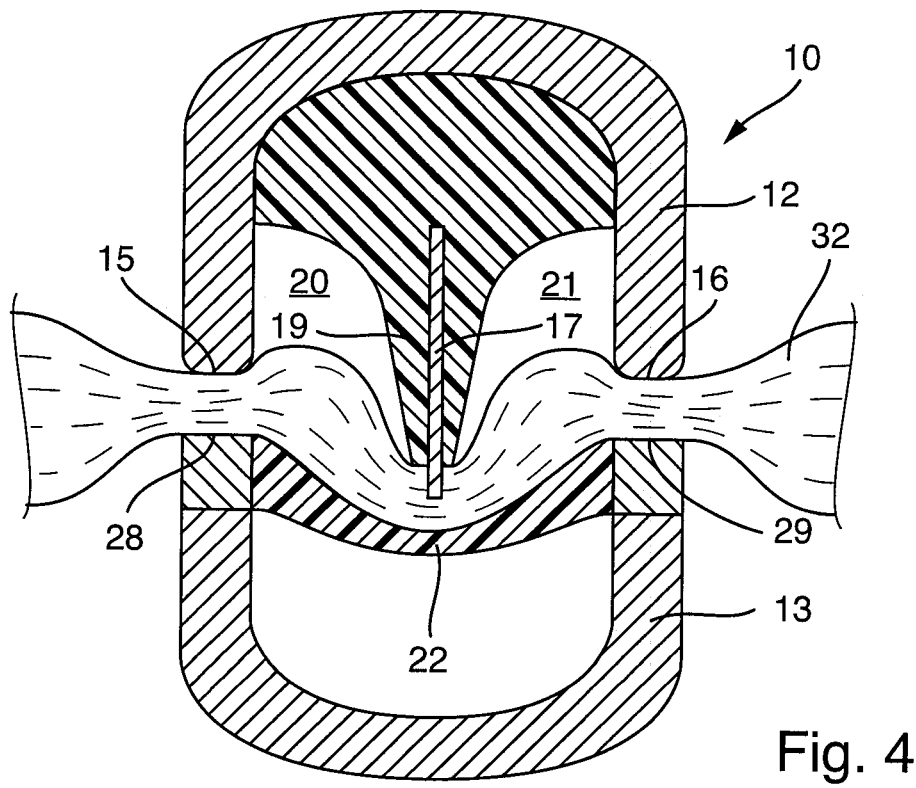

The instrument 10 operates as follows:

As illustrated in FIG. 4, for treatment of biological tissue 32 it is first held between jaws 12, 13. Biological tissue 32 can be organ tissue, a blood vessel or also other tissue. The jaws 12, 13 moved toward one another grasp the tissue 32. Concurrently or in time sequence the coagulation electrodes 15, 28, 16, 29 are applied with coagulation voltage and the cutting electrode 17 is applied with cutting voltage. As shown in FIG. 2, counter support 22 has dodged the cutting electrode 17 during closing of the instrument 10 and has been tensioned thereby. However, thereby counter support urges the tissue 32 against cutting electrode 17. The biological tissue 32 can enter into the clearances 20, 21 on both sides of extension 19. The coagulation electrodes 15, 28 as well as 16, 29 coagulate the tissue held between them and fusion it in case it is a vessel, i.e. close it at these locations. The tissue that is applied with a respective higher cutting voltage by cutting electrode 17 shrinks and separates, whereby counter support 22 holds the shrinking tissue on cutting electrode 17.

Figure 5:
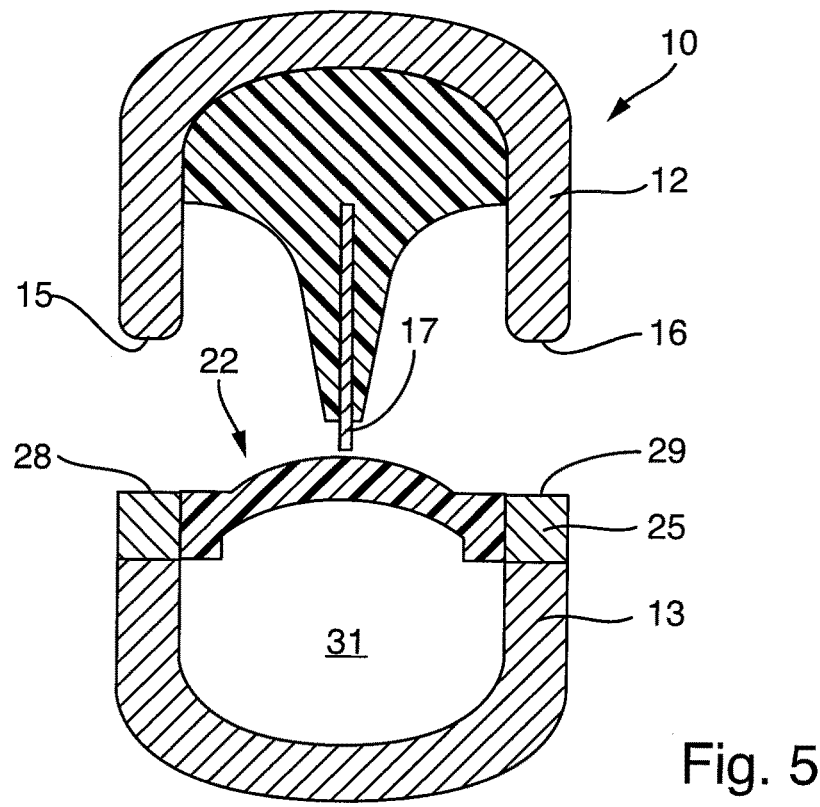
Figure 6:
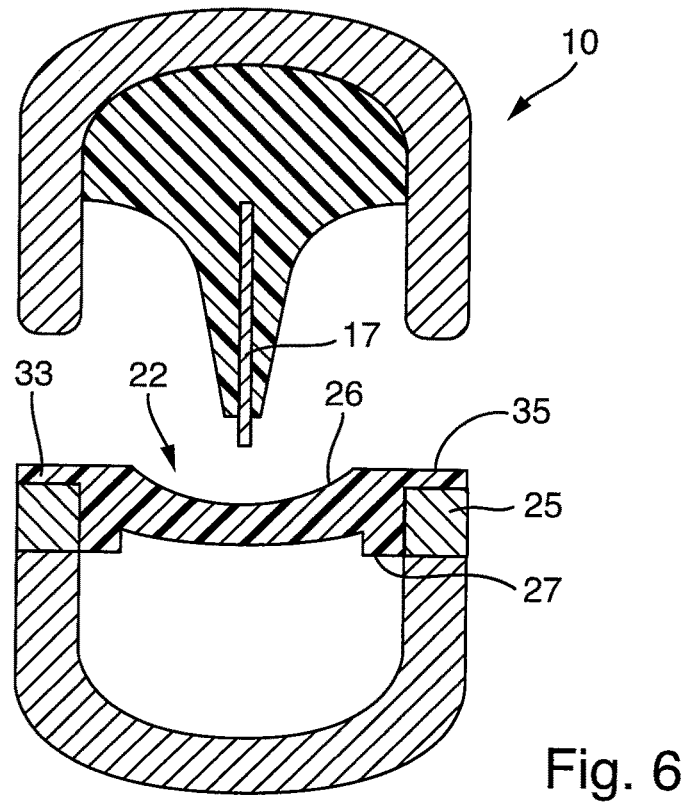
Figure 7:
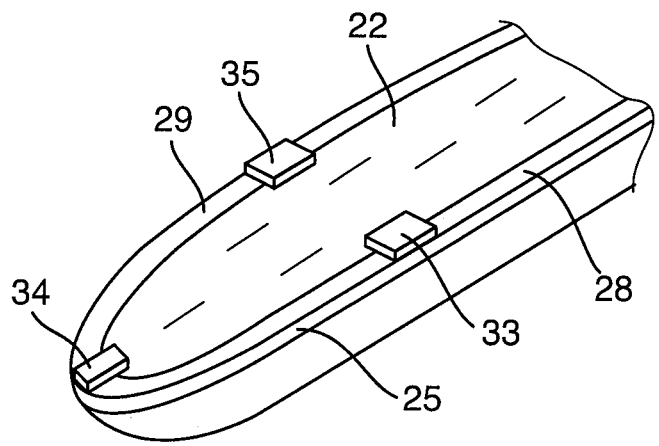

Modifications are possible in the invention described so far. For example, as illustrated in FIG. 5, counter support 22 can be convexly domed toward cutting electrode 17. This results in that the dome of the counter support 22 has to be first overcome during closing of instrument 10, whereby a certain snap effect may occur. Alternatively, counter support 22 can also be completely planar. Apart therefrom the description of FIGS. 1-4 applies correspondingly for the embodiment of instrument 10 according to FIG. 5.

The counter support 22 can also be planar or concave, as in the embodiments according to FIGS. 1-4, i.e. configured in a manner domed away from cutting electrode 17. With the progress of the thickness from the center 23 toward the edge of counter support 22 as well as the dome desired spring characteristics, i.e. path-force-progresses, can be adjusted that can be achieved during closing of instrument 10.

In all of the embodiments described above, counter support 22 can comprise extensions 33, 34, 35 that project over the frame 25 and thus avoid a direct contact of coagulation electrodes 15, 16 with coagulation electrodes 28, 29. Apart therefrom, however, also in this embodiment counter support 22 preferably ends flush with frame 25 at its top side 26 as well as its bottom side 27.

Figure 8:
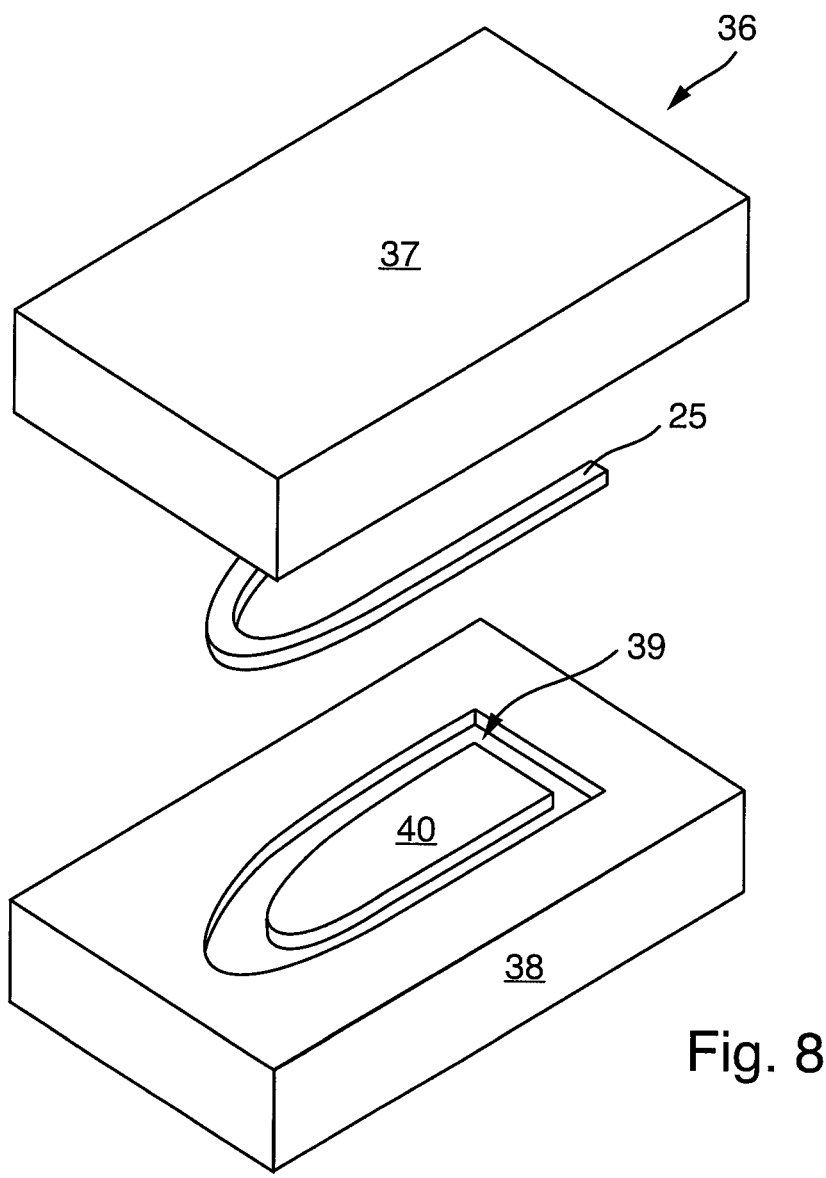

Manufacturing of counter support 22 shall be illustrated with reference to FIG. 8. A plastic injection molding die 36 is provided for this purpose between the top die half 37 thereof and the bottom die half 38 thereof an engraving 39 is formed that defines the form of the counter support to be produced. In the engraving 39 a central elevating projection 40 is illustrated in FIG. 8 that reduces the thickness of counter support 22 to be created in the central section.

For manufacturing of counter support 22, the frame 25 is inserted into engraving 39 while the plastic injection molding die 36 is open, and the injection molding die 36 is closed subsequently. Subsequently a liquid plastic is filled into engraving 39 such that it fills the provided space entirely and abuts against the inner side of frame 25 and adhesively connects therewith. After curing of the plastic, the plastic injection molding die 36 can be opened and counter support 22 can be removed.

In the inventive instrument 10 that is preferably usable for tissue fusion and cutting, counter support 22 configured as thin membrane is assigned to a cutting electrode 17 arranged between two electrode pairs. The thin membrane is spanned in a frame 25 on which it is held with its circumferential surface in a substance bond manner. The circumferential surface thereby extends in an angle, preferably in a right angle, relative to the coagulation electrodes 28, 29 formed by the frame top side. The pressing force applied by the membrane with which biological tissue 32 is pressed against cutting electrode 17 is thus predominantly created by tensile stress present in the membrane.

LIST OF REFERENCE SIGNS 5 leg face of metal part 14
10 instrument
11 shank
12 top jaw
13 bottom jaw
14 metal part
15, 16 coagulation electrodes of top jaw 12
17 cutting electrode
18 insulating body
19 extension of insulating body
20, 21 clearances
22 counter support 23 central section of counter support 22
24 circumferential surface of counter support
25 frame
26 top side of counter support 22
27 bottom side of counter support
28, 29 coagulation electrodes of bottom jaw 13
30 metal part
31 clearance
32 biological tissue
33-35 extensions
36 plastic injection molding die
37 top die half
38 bottom die half
39 engraving
40 projection
A hinge axis
$D_M$ thickness measured in the central section of counter support
$D_R$ thickness at the edge of counter support

The invention claimed is:

1. An instrument (10) for cutting or for combined tissue fusion or coagulation and tissue cutting, the instrument (10) comprising:
    two jaws (12, 13), wherein at least one of the two jaws (12, 13) is a movable jaw that is movably supported toward and away from the other of the two jaws (12, 13);
    a cutting electrode (17) that is arranged on one of the two jaws (12); and
    an elastic counter support (22) assigned to the cutting electrode (17), wherein the elastic counter support (22) is arranged on the other of the two jaws (13) and is held in a frame (25), wherein the elastic counter support (22) has a circumferential surface (24) extending between top and bottom sides (26, 27) of the elastic counter support (22) that is in abutment with the frame (25);
    wherein the elastic counter support (22) is connected at its circumferential surface (24) with the frame (25) in a tensile-resistant manner;
    wherein the elastic counter support (22) is connected with the frame (25) in a substance bond manner;
    wherein the elastic counter support (22) is held in the frame (25) such that the elastic counter support does not abut against a surface of the frame facing opposite an intruding direction of the cutting electrode.

2. The instrument according to claim 1, wherein the elastic counter support (22) is a plastic membrane, wherein a thickness ($D_M$) measured in a movement direction of the at least one movable jaw (12) in a central section (23) of the plastic membrane, on which the cutting electrode (17) is placed during operation, is at most as large as a thickness of the plastic membrane at the circumferential surface (24).

3. The instrument according to claim 1, wherein the elastic counter support (22) is a plastic membrane, wherein a thickness ($D_M$) measured in a movement direction of the at least one movable jaw (12) in a central section (23) of the plastic membrane, on which the cutting electrode (17) is placed during operation, is less than a thickness of the plastic membrane at all other locations.

4. The instrument according to claim 1, wherein the elastic counter support (22) is a plastic membrane, wherein a thickness ($D_M$) measured in a movement direction of the at least one movable jaw (12) in a central section (23) of the plastic membrane, on which the cutting electrode (17) is placed during operation, is greater than a thickness of the plastic membrane at all other locations.

5. The instrument according to claim 1, wherein the elastic counter support (22) is formed in a concave or convex domed manner on a side facing the cutting electrode (17) when the elastic counter support (22) is in a rest condition.

6. The instrument according to claim 1, wherein the elastic counter support (22) is configured and arranged in an opening limited by the frame (25) such that it entirely closes the opening.

7. The instrument according to claim 1, wherein the elastic counter support (22) is configured to end flush with the frame (25) at a top side (26) as well as a bottom side (27) of the elastic counter support (22).

8. The instrument according to claim 1, wherein the elastic counter support (22) comprises a section (33, 34, 35) extending on or over a jaw-facing surface of the frame (25).

9. The instrument according to claim 8, wherein the section (34) is arranged at a distal end of the other of the two jaws (13).

10. The instrument according to claim 1, wherein the elastic counter support is made according to a method comprising the following steps:
    activating a surface of the frame (25) to be connected with the elastic counter support (22) to improve adhesion of the elastic counter support (22) to the frame surface;
    arranging the frame (25) in an engraving (39) of a plastic injection molding die (36) configured for locating the frame (25) therein;
    introducing plastic in the engraving (39) such that the plastic contacts and adhesively connects with frame (25);
    solidifying the plastic such that it forms the elastic counter support (22) together with the frame (25); and
    opening the plastic injection molding die (36) and removing the elastic counter support (22).

* * * * *